J. McGINNIS.
PNEUMATIC TIRE.
APPLICATION FILED OCT. 11, 1911.
1,021,616.
Patented Mar. 26, 1912.
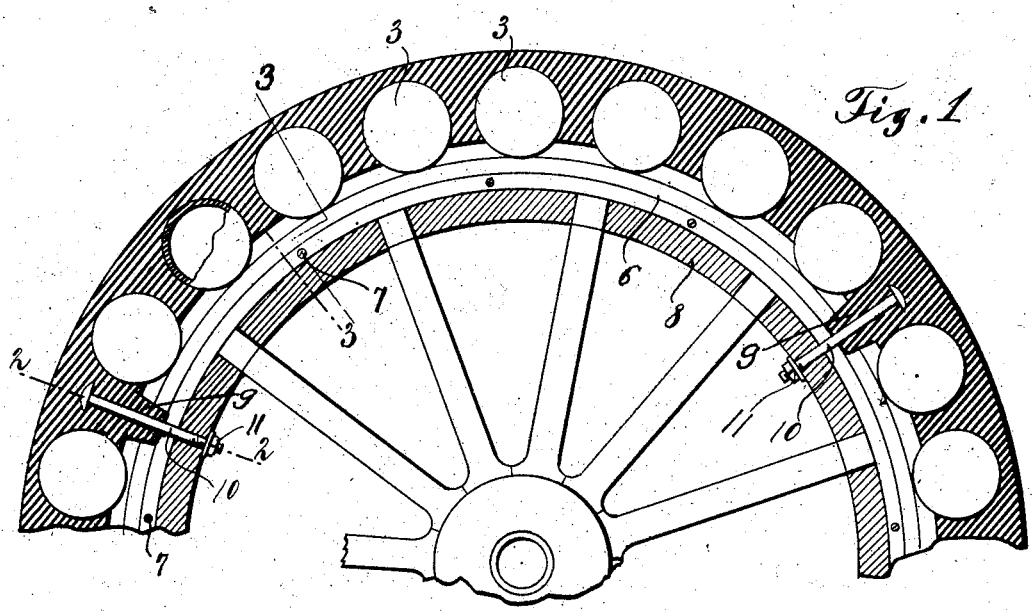
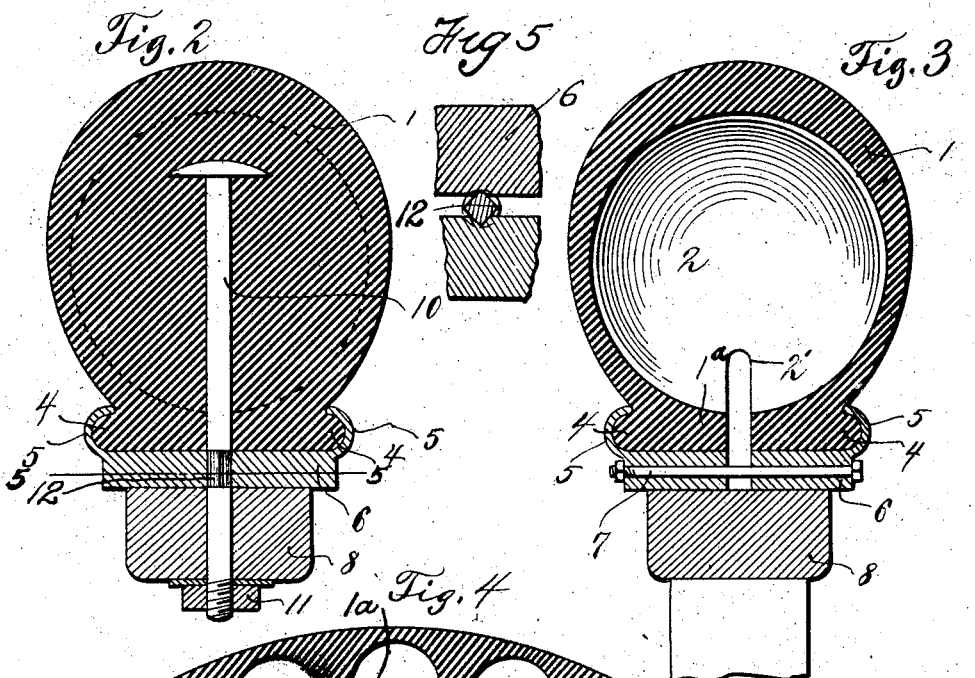
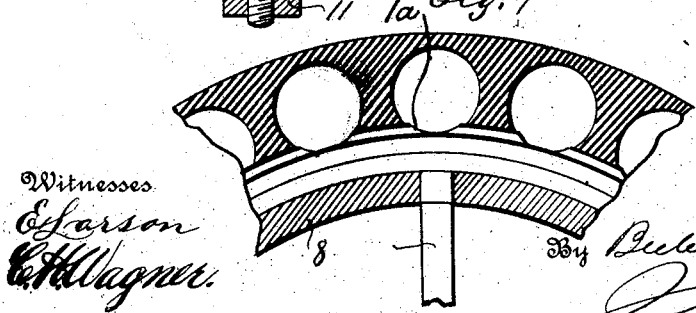
Witnesses
E. Larson
E. H. Wagner
Inventor
James McGinnis
By Robb & Robb
Attorneys

UNITED STATES PATENT OFFICE.

JAMES McGINNIS, OF JOHNSTOWN, PENNSYLVANIA.

PNEUMATIC TIRE.

1,021,616.　　　　　Specification of Letters Patent.　　Patented Mar. 26, 1912.

Application filed October 11, 1911. Serial No. 654,052.

*To all whom it may concern:*

Be it known that I, JAMES McGINNIS, a citizen of the United States, residing at Johnstown, in the county of Cambria and State of Pennsylvania, have invented certain new and useful Improvements in Pneumatic Tires, of which the following is a specification.

My invention relates particularly to improvements in that type of resilient tires of composite structure, shown and described in my previous application, Serial Number 448,395, filed August 13, 1908.

It has long been a desideratum in the art of making hollow rubber tires for automobiles and similar vehicles, to provide an article of this class in which the liability of puncture is minimized as much as possible and which, in the event of puncture, will afford advantages from the standpoint of quick repair, etc.

In my previous application, I described a tire embodying an outer casing and a plurality of separate interior air chambers formed by inflated elements such as balls. By exhaustive experiments, I have ascertained that, in the use of a tire of the type above referred to, one of the chief difficulties preventing the employment of the article for commercial purposes, resides in the fact that the inflated elements are ruptured by reason of relative movement of their casing or inclosing tube relative to the rim of the wheel to which the tire is applied. The rupturing of the inflated elements of the tire is probably caused to a certain degree also by the tendency thereof to move relative to the casing itself by which they are surrounded.

It has therefore been my object in the completion of the present invention to afford a construction of tire eliminating defects of principle, such as above described, my present invention utilizing the main features involving the outer casing and inflated balls or elements for holding said casing expanded and giving the necessary resiliency to the tire as a whole. Combined with the above features, however, I have employed special anchoring means for connecting the casing with the rim of the wheel in such a manner as to reinforce the continuous connection between the rim and the innermost annular portion of the casing, thus eliminating all possibility of slipping of the tire bodily on the rim and fracture or rupture of the inflated elements. The anchoring means proposed above performs the function referred to and the additional function of a resistance or stop means to prevent liability of shifting of the inflated elements relatively to the tire casing, the whole arrangement being especially advantageous in that a practical commercial tire is produced thereby.

For a full understanding of the present invention, reference is to be had to the following description and to the accompanying drawings, in which—

Figure 1 is a vertical sectional view of a tire embodying the essential features of the present invention. Fig. 2 is a cross sectional view taken about on the line 2—2 of Fig. 1. Fig. 3 is a cross sectional view taken about on the line 3—3 of Fig. 1, the inflated ball removed. Fig. 4 is a fragmentary view in section showing more clearly the transverse webs. Fig. 5 is a detail section on the line 5—5 of Fig. 2.

Throughout the following detail description and on the several figures of the drawings, similar parts are referred to by like reference characters.

In the drawings, the numeral 1 denotes the casing or tube of the tire, the same being preferably made of rubber or combination rubber and fabric, and molded or otherwise formed, in manufacture, interiorly with a plurality of transverse webs 2 which separate the hollow portion of the casing 1 into a plurality of compartments in which are mounted the inflated elements 3 which preferably comprise balls or hollow spherical members. At its inner or base portion, the casing 1 is split annularly so as to facilitate separation of the sides of the casing in the operation of introducing into the same the inflated elements 3, and slots 2' extend inwardly from the lower edges of the webs 2 to permit spreading of portions on opposite sides thereof for the same purpose. Furthermore, the spaced base portions of the casing 1, which are designated 1ª are formed with the annular projections or flanges 4, which are engaged by the clamping flanges 5 on the rim 6, the latter being made in two sections, each of which has one of the flanges 5.

The sections of the rim 6 are connected together by bolts 7 or other fastening means which really constitute tension devices for drawing the sections 6 together and in this manner operatively engaging the rim with the base of the tire. At intervals certain of the webs 2 are provided between a series of the chambers containing the inflated elements 3 with integral projections 9 of a diameter equal to or larger than the diameter of the inflated elements 3, said projections 9 abutting with the rim 6 and being firmly attached to the rim by the anchoring devices 10 which consist of bolts or similar members, the body portions of which are embedded or incorporated in the projections 9 and webs 2 when the casing 1 is molded or formed in manufacture. The anchoring devices 10 project through the rim 6 between the sections of the latter and are firmly attached to the rim and felly 8 by the provision of suitable nuts 11.

The projections 9 above described afford in connection with the members 10 anchoring means positively preventing liability of shifting or slipping of the tire on the rim, by which action I have found that the balls or inflated elements 3 become twisted, distorted, or otherwise moved in a way that causes fracture of said balls, which fracture necessarily renders the tire defective.

The advantages in employing the inflated elements 3, according to the construction above set forth, reside particularly in the fact that even though one of these elements becomes punctured in the use of the tire, the whole tire is not flattened or deflated, but the casing will be maintained expanded by the unpunctured elements 3. Furthermore, on puncture of one of the elements 3, it may be readily removed and a new inflated member substituted therefor, under which conditions the life of the tire is prolonged at a comparatively small expense for up-keep.

Where the sectional rim 6 is employed to avoid liability of movement of the tire thereon, the anchoring devices 10 may be squared at points intermediate their ends, as shown at 12, the sections of the rim 6 engaging the squared portion. The interlocking engagement of the rim 6 with the members 10, as above described, also prevents liability of rotation of the anchoring devices 10 in the projections 9, whereby looseness of the connection between said parts would be created disadvantageously to effective attachment of the casing 1 with respect to the wheel.

Having thus described the invention, what is claimed as new is:

In combination with a wheel embodying a suitable rim, a continuous tire applied to said wheel and comprising an irregular hollow casing, the hollow portion being formed by a plurality of transverse webs providing chambers and having the base portion thereof split annularly, inflated elements arranged in said chambers and adapted to be introduced into the casing by spreading the split parts of the base aforesaid, certain of said webs being provided at intervals between series of the chambers with projections seating on the rim, and anchoring means connecting said certain webs with the rim, whereby slipping of the casing on the rim and fracture of the inflated element is prevented.

In testimony whereof I affix my signature in presence of two witnesses.

JAMES McGINNIS.

Witnesses:
PERCY ALLEN ROSS,
SARA A. STROUP.

---

Copies of this patent may be obtained for five cents each, by addressing the "Commissioner of Patents, Washington, D. C."